United States Patent Office 3,661,763
Patented May 9, 1972

3,661,763
TUBULAR OZONIZER
Joseph Cremer, Hermulheim, near Cologne, and Herbert Panter, Kurt-Alstadten, near Cologne, Germany, assignors to Knapsack Aktiengesellschaft, Knapsack, near Cologne, Germany
Filed Mar. 18, 1969, Ser. No. 808,228
Claims priority, application Germany, Apr. 2, 1968,
P 17 67 109.9
Int. Cl. C01b 13/12
U.S. Cl. 204—321
10 Claims

ABSTRACT OF THE DISCLOSURE

Tubular ozonizer substantially comprising an oxygen chamber, an ozone chamber, a discharge chamber and a coolant container surrounding the discharge chamber bounded by two metal electrodes, which are concentrically telescoped one into the other, have an open upper end and a closed lower end, and have an associated dielectrical tube arranged therebetween so as to leave two discharge spaces. The partition plate between the ozone chamber and oxygen chamber is formed with a bore into which the dielectrical tube is telescoped so as to be radially spaced therefrom, and a packing ring is provided in the annular gap left between the dielectrical tube and the wall of the bore in the partition wall, the packing ring having a centering ring mounted thereon to provide support for the upper flanged edge of the tensionally held, inner electrode.

Figure 2:
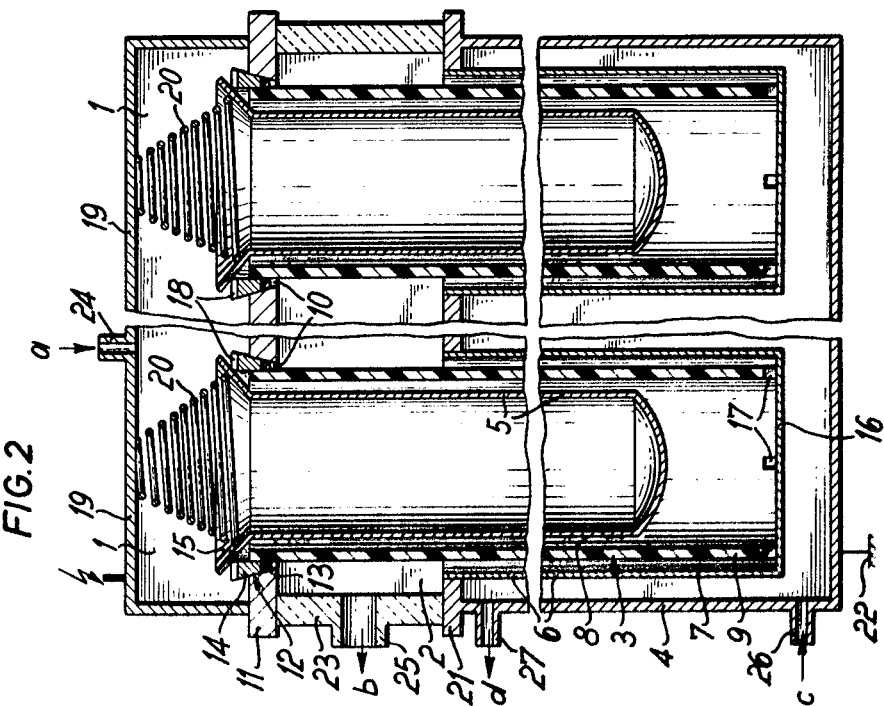

The present invention relates to a tubular ozonizer substantially comprising an oxygen chamber, an ozone chamber, a discharge chamber and a coolant container surrounding the discharge chamber that is bounded by two metal tubes which serve as electrodes, are concentrically telescoped one into the other, have an open upper end and a closed lower end, and have an associated dielectric tube arranged therebetween, so as to form two discharge spaces.

Ozone is usually produced commercially by silent electrical discharge. The reason for this is that the low energy density of such discharge is a decisive condition precedent to favorable setting of the strongly temperature responsive ozone formation or decomposition equilibrium, and that flowing gases permit simple and continuous operation. By varying the residence times of the gases in the discharge zone, it is possible to influence, for example, the ozone concentration, the quantity of ozone produced per unit of time and the specific consumption of electrical power. These values can also be influenced by purely structural means and by varying the electrical power supplied.

In a conventional tubular ozonizer of the type described above, the two upper, open ends of the inner and outer electrodes are arranged approximately level with one another and formed with a structural member common to the electrodes and the dielectric tube. This structural member is used for clamping the tubes and centering them, and for supplying and removing the gas to be ozonized. The necessary electrical power is fed through a bore disposed centrically in the structural part common to the tubes, and directly applied to the inner electrode, from the inside.

The object of the present invention is to provide a tubular ozonizer for the production of fairly high ozone concentrations in the ozonized gas with relatively little expenditure of electrical power. This is substantially achieved in accordance with the present invention, using an apparatus, wherein the dielectrical tube is telescoped into but radially spaced from a bore formed in a partition plate inserted between the oxygen and ozone chambers, so as to leave an annular gap therebetween, and wherein a packing ring, which is provided in the annular gap left between the dielectrical tube and the wall of the bore in the partition plate, has a centering ring mounted thereon to provide support for the upper flanged edge of the tensionally held, inner electrode. These are the constructional means needed to obtain a tubular ozonizer of the type described above which combines simple design with sturdiness and unsusceptibility to disturbances. By the packing ring inserted in the annular gap left between the dielectrical tube and the wall of the bore in the partition plate, the ozone chamber and oxygen chamber are reliably sealed with respect to one another, and mixing of feed gas with final gas, i.e. mixing of oxygen with ozone, is effectively avoided. Although reference is made herein to oxygen and ozone, it is not obligatory to use pure oxygen and pure ozone. Gas having enriched oxygen therein can also be used. Similarly, it often will be the case that the final gas is an ozone/oxygen mixture, which awaits some finishing treatment, rather than pure ozone. Needless to say the formation of an ozone/oxygen mixture with a fairly high ozone content is highly desirable. The centering ring mounted on the packing ring is intended to maintain the said packing ring in position and prevent it from being forced upwardly under excess pressure, if any. The top edge of the centering ring provides support for the upper flanged edge of the inner electrode.

In accordance with a further feature of the present invention, the partition plate is formed with a conical bore and the upper end of the dielectrical tube is arranged so as to be approximately in alignment with the upper surface of the partition plate. In other words, simplest structural means enable the dielectrical tube and partition plate to be clamped and effectively sealed.

In accordance with a still further feature of the present invention, the dielectrical tube, which has a plurality of gas passageways in its lower end, is arranged to touch the bottom of the outer electrode. This means in other words that the dielectrical tube is supported twice and therefore must merely have the necessary dielectric strength, while mechanical stress can be ignored.

The lower end of the outer electrode should advantageously be formed with an associated means for centering the dielectrical tube. It is thereby ensured that the dielectrical tube always is equally spaced firstly from the outer electrode, and secondly from the inner electrode. This obviates uncontrollable field intensity variations, which generally affect the ozone formation or decomposition equilibrium.

In accordance with a still further feature of the present invention, the upper edge of the centering ring has associated slit-shaped gas passageways and a wedge-shaped cross-sectional area, which is conformed to the inclination of the bore wall in the partition plate. The slit-shaped passageways have dimensions such that the gas flowing therethrough is subject to significant pressure loss. This is done to ensure uniform gas throughput rates through every system, particularly when a plurality of individual ozonizer systems are connected parallel with each other.

An electrically conducting pressure spring may advantageously be arranged between the ozonizer head and the flanged edge of the inner electrode. The spring enables the inner electrode to be reliably fastened and makes it unnecessary to use special electric lines for the supply of power to the inner electrode.

The outer electrode is fastened, for example welded, to the cover of the coolant container. This provides a solid connection between the outer electrode and the coolant container cover. At the same time, it is also ensured that the outer electrode is always set to earth potential because of the good metallic contact provided by such connection.

A still further feature of the present invention provides for parallel connection, with respect to gas flow, of a plurality of individual systems, every individual system comprising outer electrode, dielectrical tube, inner electrode, packing ring, centering ring and pressure spring, the oxygen chamber, ozone chamber and coolant container being common to all of the systems. It is then no problem to arrive at larger units for high gas throughput rates, i.e. high ozone production.

The ozonizer head is advantageously set to working voltage and the coolant container is set to earth potential. To this effect and for reasons of insulation, an electrically insulating adapter, for example a porcelain adapter, is provided between the ozonizer head and the coolant container.

Figure 1:
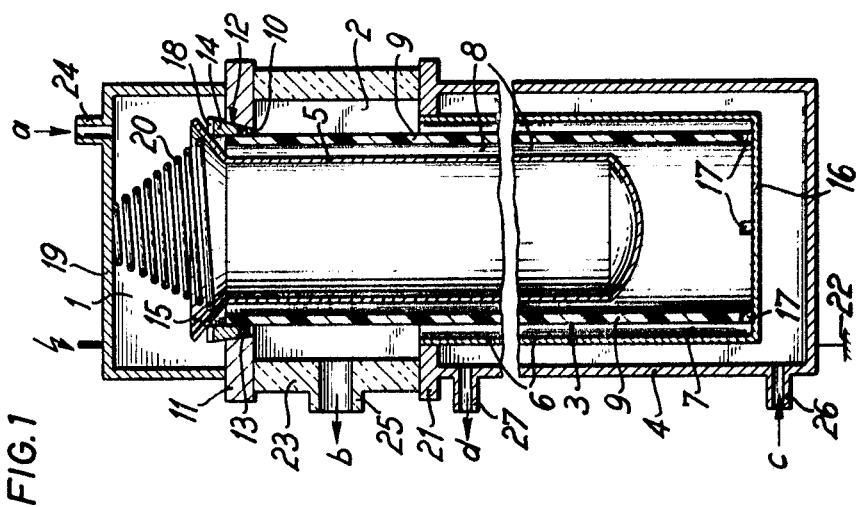

The apparatus of the present invention is shown diagrammatically in the accompanying drawing, wherein FIG. 1 represents a longitudinal section through a single tubular ozonizer system and FIG. 2 represents a longitudinal section through tubular ozonizer double system.

As shown in the drawing, the tubular ozonizer of the present invention substantially comprises an oxygen chamber 1, an ozone chamber 2, a discharge chamber 3 and a coolant container 4 surrounding discharge chamber 3. Discharge chamber 3 is bounded by two metal tubes 5 and 6 which serve as electrodes, are concentrically telescoped one into the other, have an open upper end and a closed lower end, and have an associated dielectrical tube 9 arranged therebetween so as to form two discharge spaces 7 and 8. The dielectrical tube 9 is telescoped into but radially spaced from a bore 10 in partition plate 11, which is disposed between the oxygen and ozone chambers 1 and 2, respectively. The annular gap so formed between dielectrical tube 9 and wall 12 of the bore in partition plate 11, receives packing ring 13, which has a centering ring 14 mounted thereon to provide support for the upper flanged edge 15 of the tensionally held, inner electrode 5.

The bore 10 in partition plate 11 is conically shaped. The upper end of the dielectrical tube 9 is arranged so as to be approximately in alignment with the upper surface of partition plate 11. The dielectrical tube 9, which has a plurality of gas passageways 17 in its lower end, is arranged to touch the bottom of outer electrode 6. The lower end of outer electrode 6 may be formed with an associated means for centering dielectrical tube 9 (not shown in the drawing).

The upper edge of the centering ring has associated slit-shaped gas passageways 18 and a wedge-shaped cross-sectional area, conformed to the inclination of bore wall 12 in the partition plate.

An electrically conducting pressure spring 20 is provided between ozonizer head 19 and the flanged edge 15 of inner electrode 5. The electrically conducting spring 20 enables the inner electrode 5 to be reliably fastened to centering ring 14 and facilitates the supply of electrical power.

In contrast with the inner electrode, the outer electrode 6 is fastened, i.e. welded, to cover 21 of coolant container 4.

As shown in FIG. 2, two systems, of which each individual system comprises an outer electrode 6, a dielectrical tube 9, an inner electrode 5, a packing ring 13, a centering ring 14 and a pressure spring 20 are connected parallel with one another, with respect to gas flow. Needless so say substantially more than the two systems shown in FIG. 2, for example ten, thirty, fifty or more systems, can be connected parallel with each other. The oxygen chamber 1, ozone chamber 2 and coolant container 4 are common to all of the systems.

The ozonizer head is always set to working voltage and the coolant container 4 is set to earth potential 22. To this effect, it is necessary to provide an electrically insulating adapter 23, for example a porcelain adapter, between ozonizer head 19 and coolant container 4.

The ozonizer of the present invention can be operated in very simple manner. Oxygen or gas enriched with oxygen, which is introduced in the direction indicated by arrow $a$ through intake pipe 24 into oxygen chamber 1, is conveyed through slit-shaped passageways 18 to the inner discharge space formed between inner electrode 5 and dielectrical tube 9 and finally leaves inner discharge space 8 through passageways 17 in the dielectrical tube. The gas to be ozonized then flows through outer discharge space 7 formed between outer electrode 6 and dielectrical tube 9 into ozone chamber 2 to leave it in the direction indicated by arrow $b$ through outlet pipe 25, in the form of ozone or an oxygen/ozone mixture. The heat set free during operation of the ozonizer is eliminated by means of a coolant in container 4, for example water. Container 4 is formed with an intake 26 and an outlet 27, which enable warm cooling water to be continuously removed and replaced with fresh cold water. The cooling water travels in the direction indicated by arrow $c$ through intake 26 into coolant container 4 and leaves it through the outlet pipe, in the direction indicated by arrow $d$.

The invention is in no way limited to the apparatus shown in the accompanying drawing by way of example only, and admits of various modifications without departing from its scope.

What is claimed is:

1. In a tubular ozonizer substantially comprising an oxygen chamber with a cover thereabove, a discharge chamber disposed downstream of the oxygen chamber and bounded by an inner and an outer tubular electrode which are concentrically telescoped one into the other, have an open end and have an associated dielectrical tube open at its two ends arranged therebetween so as to form two discharge spaces, a coolant container surrounding the discharge chamber and an ozone chamber adjacent the oxygen chamber but separated therefrom by a partition plate, the improvement according to which the said partition plate is formed with a conically shaped bore into which the dielectrical tube is telescoped so as to be radially spaced therefrom; the inner tubular electrode is fitted at its upper end with a flanged edge; a packing ring is provided in the annular gap left between the dielectrical tube and the conical wall of the bore in the partition plate; a centering ring is provided which supports the peripheral portion of the flanged edge of the inner tubular electrode, and of which the underside enables pressure to be exerted against said packing ring, the centering ring having a plurality of slit-shaped gas passageways disposed near its upper edge, and a wedge-shaped cross-sectional area conformed to the inclination of the bore wall in the partition plate; and an electrically conducting pressure spring is provided, which forces said flanged edge of the inner tubular electrode into contact with said centering ring, the upper end of said pressure spring bearing against the cover of the oxygen chamber, and the lower end thereof being held in contact with the inner surface of said flanged edge of the inner tubular electrode whereby said inner electrode is seated and centered and the efficiency of electrical energy consumption by said ozonizer is unexpectedly improved.

2. The ozonizer of claim 1, wherein the dielectrical tube has a plurality of gas passageways disposed in its lower end and is arranged to touch the bottom of the outer electrode.

3. The ozonizer of claim 1, wherein the lower end of the outer electrode is formed with means for centering the dielectrical tube.

4. The ozonizer of claim 1, wherein the outer electrode is fastened to the coolant container cover.

5. The ozonizer of claim 4, wherein the outer electrode is welded to the coolant container cover.

6. The ozonizer of claim 1, wherein a plurality of systems, of which each individual system comprises outer electrode, dielectrical tube, inner electrode, packing ring, centering ring and pressure spring are connected parallel with each other, with respect to gas flow, the oxygen chamber, ozone chamber and coolant container being common to all of the systems.

7. The ozonizer of claim 1, wherein the ozonizer is set to working voltage and the coolant container is set to earth potential.

8. The ozonizer of claim 1, wherein an electrically insulating adapter is provided between the ozonizer head and the coolant container.

9. The ozonizer of claim 8, wherein a porcelain adapter is used.

10. The ozonizer of claim 1 wherein the upper end of the dielectrical tube is arranged so as to be approximately in alignment with the upper surface of the partition plate.

References Cited

UNITED STATES PATENTS

| | | | |
|---|---|---|---|
| 2,710,835 | 6/1955 | Pardey | 204—320 |
| 3,364,129 | 1/1968 | Cremer et al. | 204—321 |
| 1,163,768 | 12/1915 | Otto | 204—321 |
| 1,834,705 | 12/1931 | Hartman | 204—321 |
| 1,201,379 | 10/1916 | Steynis | 204—321 |
| 1,312,484 | 1919 | Knox et al. | 204—320 X |
| 2,936,279 | 5/1960 | Rindtorff et al. | 204—320 X |
| 3,551,321 | 12/1970 | Guillerd et al. | 204—321 X |
| 3,442,782 | 5/1969 | Shiller et al. | 204—286 X |

FOREIGN PATENTS

| | | | |
|---|---|---|---|
| 1,172,448 | 1964 | Germany | 204—195 F |

TA-HSUNG TUNG, Primary Examiner

R. J. FAY, Assistant Examiner